United States Patent Office

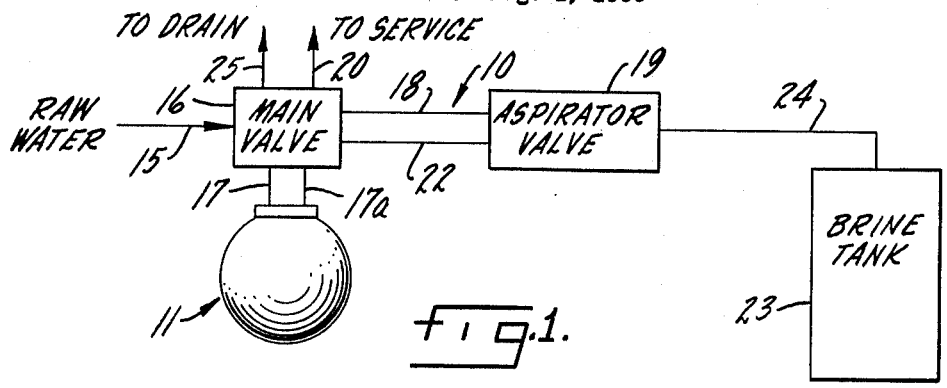

3,503,513
Patented Mar. 31, 1970

3,503,513
LIQUID TREATMENT TANK
Benjamin H. Kryzer and Dennis G. Winberg, St. Paul, Minn., assignors, by mesne assignments, to The Union Tank Car Company, Chicago, Ill., a corporation of Delaware
Filed Aug. 1, 1966, Ser. No. 569,502
Int. Cl. C02b 1/40; B01d 23/24, 23/10
U.S. Cl. 210—286                              4 Claims

ABSTRACT OF THE DISCLOSURE

A liquid treatment tank, comprising a one piece spherical tank having an access port. An inlet and outlet means are mounted in said port. A flexible frusto-conical baffle having a diameter substantially larger than that of the port extends vertically within the tank and separates the interior thereof into an inlet and an outlet chamber communicating with each other near the bottom of the baffle. A bed of treatment material substantially fills the inlet and outlet chambers.

---

This invention relates in general to ion exchange treatment of a liquid. It relates more particularly to an ion exchange unit.

Ion exchange treatment of water, for example, is conventionally accomplished in a treatment tank containing a bed of a suitable ion exchange resin. A valve on the tank controls the influx of raw water and the efflux of treated water from the tank. The treatment comprises raw water being passed through the resin bed where its hardness-inducing ions are removed. Regeneration of the ion exchange resin bed is then accomplished by treating the bed with suitable chemicals to remove the hardness-inducing ions trapped in the bed while water treatment is interrupted.

It is important that raw water being treated be caused to flow uniformly through the ion exchange resin bed. Otherwise localized flow or "channeling," for example, occurs and full advantage of the ion exchange capability of the entire bed is not taken. Uniformity of flow is also important in the regeneration treatment of the ion exchange resin bed. To assure uniformly directed flow of the liquids through the tank and resin bed, a suitable flow control arrangement within the tank is conventionally utilized.

It is an object of the invention to provide a new and improved ion exchange unit construction.

It is another object to provide an ion exchange unit construction which is substantially simpler and less expensive than presently known units.

It is still another object to provide an ion exchange unit construction which utilizes a simple, unitarily spherical shell construction.

It is a further object to provide a new and improved method of constructing an ion exchange unit generally and, more specifically, a unitarily spherical ion exchange unit.

The foregoing and other objects are realized in accord with the present invention by providing a unitary treatment tank shell which is generally spherical in configuration, making it extremely simple to fabricate. Understandably, fabrication of the tank shell in this manner leaves only a relatively small opening to the interior of the shell. Nevertheless, according to the present invention, a flow control arrangement is easily introduced to the shell through the opening and suitably positioned within the shell. This flow-control arrangement takes the form of a flow-directing baffle arrangement fabricated of a relatively stiff, yet resilient material which is deformed for insertion through the opening. The resilient qualities of the baffle arrangement then cause it to reassume its original shape within the shell and provide the necessary flow directing baffling.

The invention, both as to its organization and method of operation, taken with further objects and advantages thereof, will best be understood by reference to the following description taken in connection with the accompanying drawings, in which:

FIGURE 1 is a schematic diagram of a conventional water softening system wherein water is treated with ion exchange resin particles and the particles subsequentially regenerated in a well-known manner;

FIGURE 2 is a front elevational view of an ion exchange unit constructed according to the present invention;

FIGURE 3 is a vertical sectional view taken through the ion exchange unit illustrated in FIGURE 2, with parts broken away and removed; and FIGURE 4 is a top plan view of the collapsible baffle illustrated in the ion exchange unit of FIGURE 3.

Referring now to the drawing, and particularly to FIGURE 1, there is schematically illustrated a water softening system 10 for treating water in a well-known manner. Unlike a conventional water treatment system, however, the system 10 incorporates an ion exchange unit 11 constructed and arranged according to the present invention. The ion exchange unit 11 is generally spherical in configuration, and is simpler and less expensive in construction than broadly similar presently known units.

To briefly describe the system 10, raw water is introduced through a feed line 15 to a main valve 16. The main valve 16 usually is mounted right on the unit 11. The valve 16 directs the raw water into the unit 11 through the passage 17 where it is treated. The treated water passes from the unit 11 through the passage 17a and the valve 16 directs it to the service line 20 and to line 18 through an aspirator valve 19.

After a predetermined quantity of raw water has been treated in the unit 11, the ion exchange resin particles lose a substantial portion of their capacity to soften and the resin must be regenerated. In a well known manner, the regeneration cycle is initiated by actuating the main valve 16 so that raw water from the line 15 is directed from the main valve 16 through the line 22 directly to the aspirator valve 19, where it creates a partial vacuum and draws brine from the brine tank 23 through the line 24 into the valve 19. The salt laden water passes through the line 18 to the valve 16 and into the unit 11. This brine regenerates the ion exchange resin bed in the unit 11 as it passes through the bed and then passes from the valve 16 to the drain 25 in a well known manner.

Referring now more particularly to the present invention, and specifically to the ion exchange unit 11, attention is directed to FIGURES 2 and 3 of the drawing. Here it will be seen that the unit 11 includes a generally spherical shell 30. The shell 30 is cast in one piece in a well known manner. As a result, it forms a simple and exceptionally inexpensive body for the ion exchange unit 11.

The shell 30 is cast with a single access-port 31 extending through it. In the area of the shell 30 surrounding the port 31, the shell is cast with a relatively thick section, as at 32, to re-enforce the shell and provide supporting strength for the main valve assembly 16 (not shown) which is mounted on the shell 30 at the port 31.

The circular port 31 is internally threaded, as at 32, to receive a valve adapter assembly 40. The valve adapter assembly 40 includes a casting 41 having a cylindrical base 42 which is externally threaded, as at 43, for receipt in the threads 32 of the port 31.

The upper portion of the casting 41 defines a platform 45 for the main valve 16. Since the main valve 16 forms no specific part of the present invention, it is not illustrated, except schematically in FIGURE 1. The valve 16 might take the form of any one of a number of control valves presently in use for controlling service water flow and regeneration in a water conditioning system, however. In the system 10, the valve is preferably of the type illustrated in the Kryzer Patent No. 3,215,273, assigned to the same assignee as the present invention. The valve 16 is suitably mounted on the platform 45 of the adapter assembly 40.

The base 42 of the valve adapter assembly 40 is fitted with an inlet filter 50 and an outlet filter 51. The filters 50 and 51 are of generally similar molded plastic construction. Each filter 50 and 51 is hollow and open at its upper end into communication with suitably formed passages (not shown) through the valve adapter assembly 40 into communication with the valve 16. These passages are schematically seen at 17 and 17a in FIGURE 1.

The filters 50 and 51 are mounted in the base of the adapter assembly 40 by insertion down through the respective passages 17 and 17a into seated relationship extending from its base 42. Each filter 50 and 51 contains a plurality of radially disposed apertures 53 through which the raw water, treated water, and brine pass in various cycles of the system 10.

According to the present invention, the base 43 of the valve adapter assembly 40 also mounts a flow control baffle 60. The flow control baffle 60 is designed to force the inlet flow of raw water from the inlet filter 50 to pass completely through the resin bed 61 in a substantially uniform flow path to the outlet filter 51. The treated water flows from the outlet filter 51 through the valve 16 to service.

The baffle 60 is fabricated of relatively stiff yet flexibly resilient plastic, or the like. The baffle 60 includes a cylindrical neck section 63 which is slightly longer than the inlet filter 50, as illustrated, and, for that matter, also slightly longer than the outlet filter 51. The neck section 63 is seated over a correspondingly cylindrical flange 64 depending from the base 42 of the adapter assembly 40 encircling the filter 50. A conventional band clamp 65 secures the cylindrical section 63 of the baffle 60 to the flange 64 in fluid tight relationship.

The lower end of the cylindrical section 63 in the baffle 60 is unitary with and opens into a generally frusto-conical lower section 70 of the baffle. The lower section 70 is centered immediately under the center of base 43 of the valve adapter assembly 40, as illustrated, so that the cylindrical fitting 63 actually extends into communication with the section 70 through an opening 71 offset from the central axis of the lower section. The roof 72 of the frusto-conical lower section 70 around the opening 71 extends into underlying relationship with the outlet filter 51.

The diameter of the frusto-conical lower section 70 of the baffle 60 at its roof 72 is substantially equal to the diameter of the inlet port 31 to the shell 30. From the roof 72, downwardly, however, the lower section 70 of the baffle 60 increases substantially in diameter, in keeping with its frusto-conical shape. At the lower periphery 75 of the lower section 70, it is more than twice the diameter of the port 31.

The lower periphery 76 is serrated to form a series of teeth 77 whose apices 78 rest against the inner surface 79 of the shell 30. The baffle 60, which actually divides the shell 30 interior into an inner chamber 80 and an outer chamber 81, thus provides communication between these chambers under the baffle periphery 76 through passages 82 between the teeth 77. At this point, the lower periphery 76, the baffle 60 is deeply embedded in the resin bed 61, of course; the bed extending upwardly both within and without the lower section 70.

It will now be seen that the influx of raw water from the inlet filter 50 within the shell is forced to flow down through the resin bed 61 inside the baffle 60 to lower periphery 76. The water being treated then passes underneath the lower frusto-conical baffle section 70 through the passages 82 between the teeth 77 and upwardly through the bed outside of the section 70. A uniform flow of water being treated through the resin bed 61 is effected.

In addition to the actual construction and arrangement of the ion exchange unit 11 according to the present invention, the method of fabricating the unit 11 is also a part of the present invention. The substantially spherical shell 30 of the unit 11 is cast unitarily, as has been pointed out. The shell 30 is thus an inexpensive component to fabricate. The baffle 60 is molded separately in a single piece. It is also inexpensive to fabricate.

Since the baffle 60 is fabricated of flexibly resilient plastic material, it is readily compressed by bending into a generally tubular package which has transverse dimensions smaller than those of the inlet port 31. Accordingly, with the valve adapter assembly 40 removed the baffle 60 is clamped to the adapter base 42, compressed into tubular form, and inserted downwardly through the inlet port 31 into the shell 30 where it immediately expands resiliently into its original shape. The apices 78 of the lower periphery 76 on the baffle section 70 seat against the inner surface 79 of the shell 30.

The resin is then introduced to the shell 30 through the passages 17 and 17a in the adapter assembly 40, before the inlet filter 50 and outlet filter 51 are seated in place. After a sufficient amount of resin material has been introduced to substantially fill the shell 30, thus establishing the bed 61 both within and without the frusto-conical base 70 of the baffle 60, the filters 50 and 51 are inserted and the valve 16 mounted in place. The unit 11 is ready for service.

It is contemplated, of course, that the baffle 60 might take other forms than that having the frusto-conical base 70 illustrated, and still perform the function of directing the flow of water uniformly through the resin bed.

It is important only that the baffle 60 achieve a uniform direction of liquid flow through the resin bed. Whatever form the baffle 60 takes, however, it is fabricated of flexible resilient material which can be compressed for insertion through the relatively small port 31 of the shell 30, and will subsequently expand again into generally its original configuration.

While an embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A liquid treatment tank, comprising:
   (a) a generally spherical shell fabricated substantially in one piece,
   (b) an access port of predetermined diameter in said shell,
   (c) liquid inlet means and liquid outlet means mounted in said access port,
   (d) and baffle means in said shell between said inlet means and said outlet means,
   (e) said baffle means including resilient flexible wall means having a greater transverse dimension than the diameter of said port whereby said wall means must be collapsed for insertion through said port into said shell and subsequently expands within said shell to define said baffle means,
   (f) said wall means extending immediately adjacent the bottom of said shell and extending substantially vertically in said shell whereby it separates the interior of said shell into an inlet chamber and an outlet chamber, (g) resin material on the bottom of said shell and extending upwardly inside said shell on opposite sides of said wall means, (h) and means only adjacent the base of said wall means affording fluid communication between said inlet chamber and said outlet chamber, said wall means being generally frusto-conical in configuration, the lower periphery of said frusto-conical wall means being adapted to seat against the inner surface of said shell and having means formed therein for affording fluid communication between said inlet chamber and said outlet chamber.

2. The treatment tank of claim 1 further characterized in that the lower periphery of said wall is serrated to define a plurality of apices seated against said inner surface and apertures between said apices connecting said inlet and outlet chambers.

3. The treatment tank of claim 1 further characterized in that said frusto-conical wall has a generally horizontal roof thereon, and an access section of said baffle means extending from said roof into communication with one of said inlet and outlet means, said access section being offset from the vertical axis of said frusto-conical wall.

4. The treatment tank of claim 3 further characterized in that said roof extends into underlying relationship with the other of said inlet and outlet means.

References Cited

UNITED STATES PATENTS

| | | | |
|---|---|---|---|
| 563,041 | 6/1896 | Konst | 210—456 X |
| 1,789,961 | 1/1931 | Astrom | 210—286 X |
| 2,948,400 | 8/1960 | Hagen | 210—279 X |
| 2,973,097 | 2/1961 | Snider | 210—288 X |
| 2,997,178 | 8/1961 | Lorimer | 210—286 X |
| 3,063,565 | 11/1962 | Burkhardt | 210—275 X |
| 3,174,623 | 3/1965 | Sloan | 210—281 X |

SAMIH N. ZAHARNA, Primary Examiner

U.S. Cl. X.R.

210—281, 288